United States Patent
Lemmers, Jr. et al.

(10) Patent No.: US 8,432,079 B2
(45) Date of Patent: Apr. 30, 2013

(54) 2-POLE GENERATOR PACKAGING ARRANGEMENT

(75) Inventors: Glenn C. Lemmers, Jr., Loves Park, IL (US); David S. Behling, Belvidere, IL (US); Timothy R. Welch, Roscoe, IL (US); Steven C. Paul, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 232 days.

(21) Appl. No.: 12/787,365

(22) Filed: May 25, 2010

(65) Prior Publication Data

US 2011/0148234 A1    Jun. 23, 2011

Related U.S. Application Data

(60) Provisional application No. 61/284,451, filed on Dec. 18, 2009, provisional application No. 61/284,452, filed on Dec. 18, 2009, provisional application No. 61/284,453, filed on Dec. 18, 2009.

(51) Int. Cl.
*H02K 7/10* (2006.01)
*H02K 7/06* (2006.01)

(52) U.S. Cl.
USPC ............ 310/75 R; 310/83; 310/99; 310/100; 310/96

(58) Field of Classification Search ............... 310/75 R, 310/78, 83, 99, 100, 96; *H02K 7/06, 7/10*
See application file for complete search history.

(56) References Cited

U.S. PATENT DOCUMENTS

| | | | |
|---|---|---|---|
| 2,454,120 A * | 11/1948 | Atwell et al. | 310/59 |
| 4,447,737 A * | 5/1984 | Cronin | 290/6 |
| 4,545,470 A * | 10/1985 | Grimm | 464/36 |
| 4,931,680 A * | 6/1990 | Sugiyama | 310/83 |
| 4,997,072 A | 3/1991 | Lapthorne | |
| 5,023,789 A | 6/1991 | Lampe et al. | |
| 5,029,689 A | 7/1991 | Grimm | |
| 5,174,109 A | 12/1992 | Lampe | |
| 5,300,848 A * | 4/1994 | Huss et al. | 310/83 |
| 5,325,009 A | 6/1994 | Capion et al. | |
| 5,365,133 A * | 11/1994 | Raad | 310/68 D |
| 5,562,190 A | 10/1996 | McArthur | |
| 5,625,511 A * | 4/1997 | Brooks et al. | 360/99.08 |
| 6,260,667 B1 * | 7/2001 | Sugden | 188/68 |
| 6,897,581 B2 | 5/2005 | Doherty et al. | |
| 7,084,522 B2 | 8/2006 | Wobben | |
| 7,131,275 B2 | 11/2006 | Gustafson | |

(Continued)

FOREIGN PATENT DOCUMENTS

WO    WO2007096493    *    8/2007

OTHER PUBLICATIONS

Machine translation of WO2007096493, Berenger et al., Aug. 2007.*

(Continued)

*Primary Examiner* — Tran Nguyen
*Assistant Examiner* — Terrance Kenerly
(74) *Attorney, Agent, or Firm* — Carlson, Gaskey & Olds PC

(57) ABSTRACT

An accessory system includes an accessory gearbox which includes a geartrain and a 2-Pole generator integrally mounted with the accessory gearbox such that a drive gear of the generator is in meshing engagement with the geartrain, containing a shear section, disconnect mechanism, and torsional compliance.

18 Claims, 8 Drawing Sheets

U.S. PATENT DOCUMENTS

| | | |
|---|---|---|
| 2005/0184608 A1* | 8/2005 | Williams et al. ............. 310/89 |
| 2006/0059943 A1 | 3/2006 | Merritt et al. |
| 2006/0087123 A1* | 4/2006 | Stout et al. ................. 290/2 |
| 2007/0085429 A1* | 4/2007 | van der Woude ........... 310/64 |
| 2008/0174198 A1* | 7/2008 | Hollinger .................. 310/197 |
| 2009/0042656 A1* | 2/2009 | Takigawa et al. .......... 464/102 |
| 2009/0324396 A1 | 12/2009 | Short et al. |

OTHER PUBLICATIONS

Generator Rotor With Improved Hollow Shaft, U.S. Appl. No. 12/436,161, filed May 6, 2009.
Decoupler Shaft for High Speed Generator, U.S. Appl. No. 12/436,159, filed May 6, 2009.

* cited by examiner

2-POLE GENERATOR PACKAGING ARRANGEMENT

The present disclosure claims priority to U.S. Provisional Patent Application No. 61/284,451, filed Dec. 18, 2009; U.S. Provisional Patent Application No. 61/284,452, filed Dec. 18, 2009; and U.S. Provisional Patent Application No. 61/284,453, filed Dec. 18, 2009.

BACKGROUND

The present disclosure relates to a generator packaging arrangement which facilitates heavier generator installation onto smaller gearboxes without adversely affecting the gearbox weight yet maintains desired generator design features.

As modern commercial aircraft transition to a more electric architecture, relatively larger generators are being installed into smaller engine nacelles. These relatively heavier generators are also being mounted to smaller accessory gearboxes. As generator weight begins to account for the majority of the accessory gearbox load, specific design changes to the accessory gearbox may be necessary to accommodate the generator. Also, as the generator is typically cantilever mounted off the accessory gearbox, heavier generators may result in increased overhung bending moments which require increased accessory gearbox housing wall thicknesses and weight.

SUMMARY

An accessory system according to an exemplary aspect of the present disclosure includes an accessory gearbox which includes a geartrain and a 2-Pole generator integrally mounted with the accessory gearbox such that a drive gear of the generator is in meshing engagement with the geartrain.

A 2-Pole generator according to an exemplary aspect of the present disclosure includes a generator housing which defines a flange. A drive shaft assembly is supported within the generator housing and a main generator power section is supported on the drive shaft assembly axially adjacent the flange.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
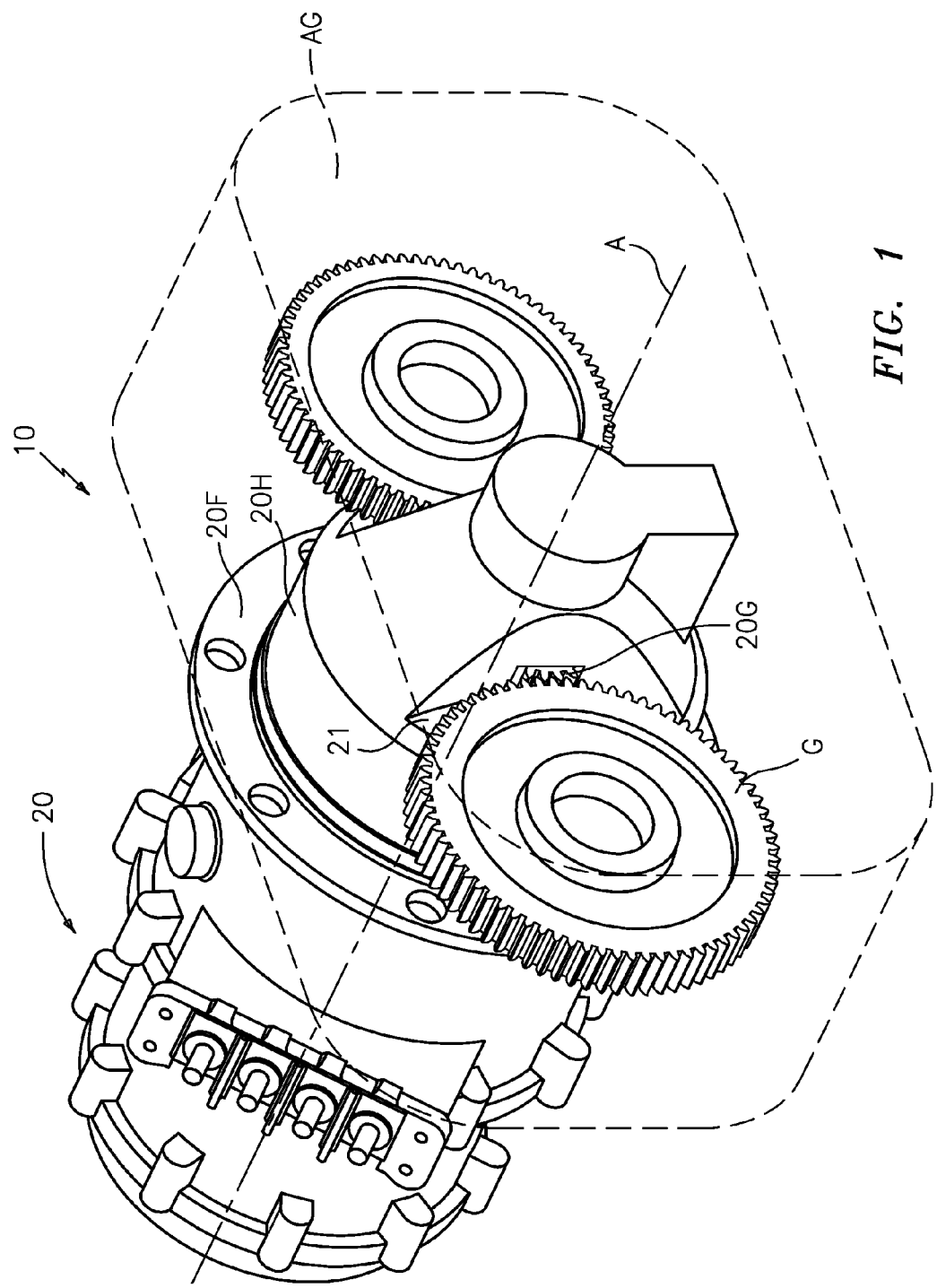
FIG. 1 is a general perspective view of a generator which mounts to an aircraft accessory gearbox.

FIG. 1 schematically illustrates a generator 20 which mounts to an aircraft accessory gearbox AG (illustrated schematically) though a drive gear 20G which rotates about a generator axis of rotation A to form an accessory gearbox system 10. It should be understood that the generator 20 may alternatively be a starter generator.

The generator 20 includes a generator housing 20H which defines a mounting flange 20F that is axially outboard of the drive gear 20G relative to the accessory gearbox AG. The drive gear 20G extends through a side area of the generator housing 20H at a scallop 21 to mesh with the geartrain G within the accessory gearbox AG. The drive gear 20G is integral with the geartrain G of the accessory gearbox AG. That is, the drive gear 20G is part of the geartrain G such that gears downstream of the drive gear 20G are utilized to drive associated accessory systems.

Figure 2:
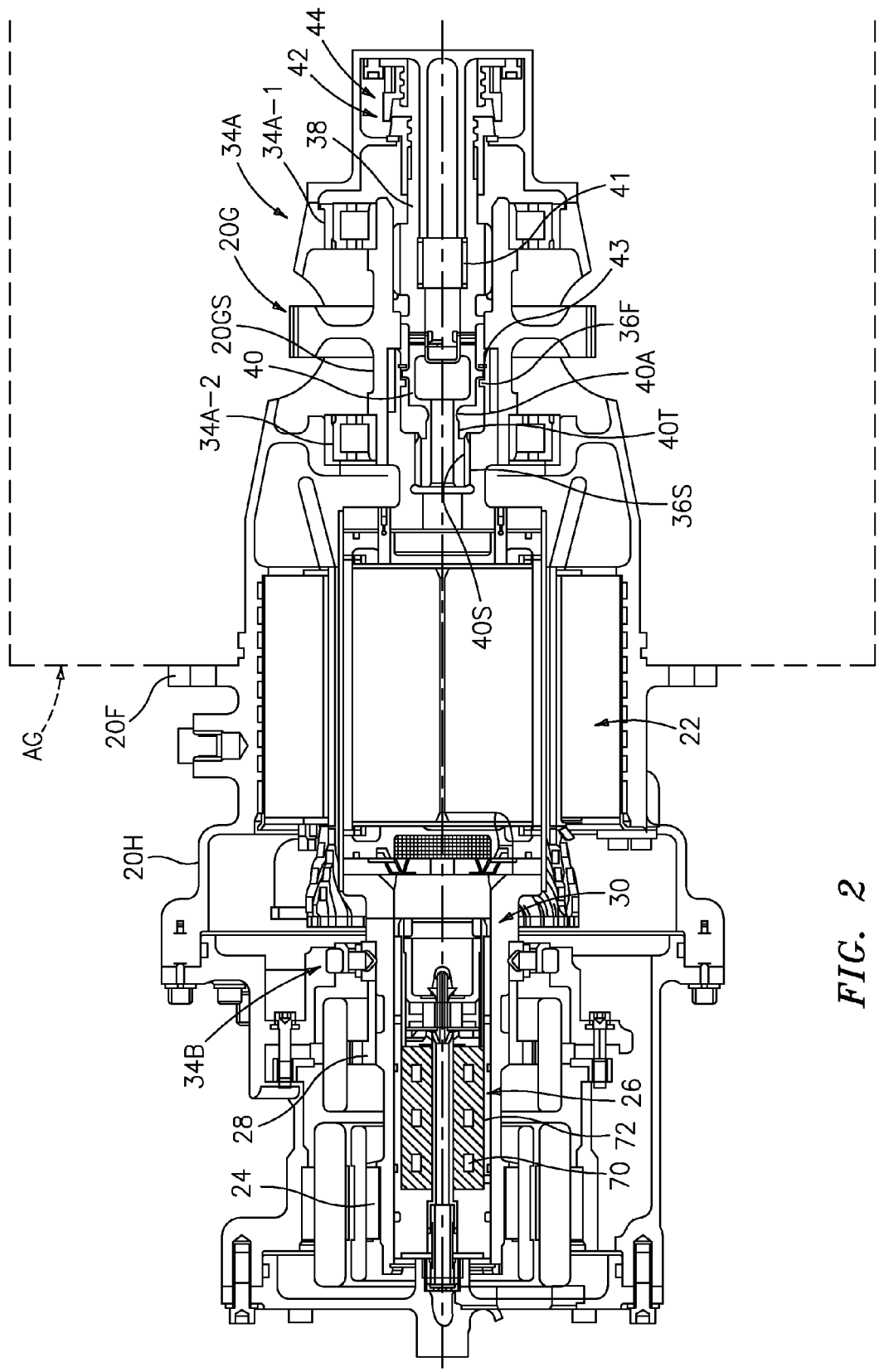
FIG. 2 is a sectional view of the generator connected to the accessory gearbox.

With reference to FIG. 2, the generator 20 generally includes a main generator power section 22, an exciter 24, a rectifier assembly 26 (illustrated schematically) and an optional permanent magnet generator (PMG) 28. The generator 20 provides a packaging arrangement in which the heaviest portions of the generator 20 such as the main generator power section 22 are located generally adjacent to the gearbox mounting flange 20F and at least partially within the accessory gearbox AG. In the disclosed, non-limiting embodiment, a 2-Pole Integrally Mounted Gearbox Generator is illustrated. It should be appreciated that a 2-pole machine operates at a relatively higher speed and may have a relatively larger core than a 4-pole machine, however a 4-pole machine provides relatively greater rotor mechanical strength and may have relatively greater reliability. It should be appreciated that any pole count design generator may be integrated with an accessory gearbox AG as described herein.

The main generator power section 22 provides alternating current (AC) power to an aircraft electrical bus (not shown). The exciter 24 provides excitation current to the field of the main generator power section 22. The rectifier assembly 26 provides conversion of exciter armature alternating current (AC) power into direct current (DC) power for the main field portion of the main generator power section 22. If generator self-excitation is required, the generator 20 will also include the PMG 28 which provides AC power to the generator control unit for generator field excitation power.

Figure 3:
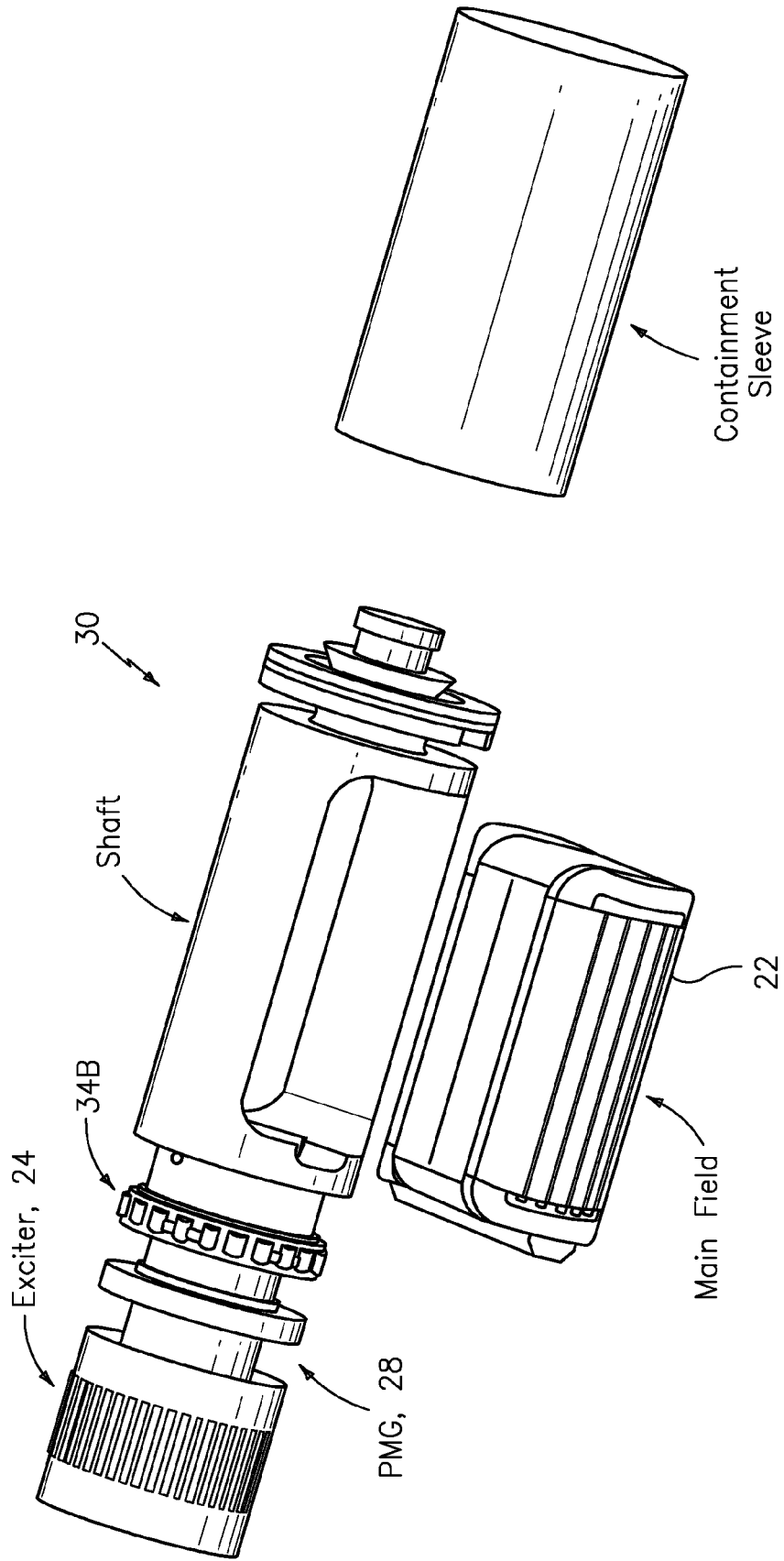
FIG. 3 is an exploded view of a rotor assembly for a 2-pole generator.

The main generator power section 22, the exciter 24, the rectifier assembly 26, and the optional PMG 28 are mounted to a common rotor shaft assembly 30 (also illustrated in FIG. 3) which is supported within the generator housing 20H of the generator 20 by bearing arrangements 34A, 34B.

The rectifier assembly 26 is mounted internal to the rotor shaft assembly 30 and typically includes three or six discrete diodes 70 arranged such that they provide rectification of the AC power developed by the exciter 24. The DC output of the rectifier assembly 26 is fed into the main field of the main generator power section 22. Location of the diodes 70 internal to the rotor shaft assembly 30 provides an efficient use of space within the generator 20. The discrete diodes 70 and associated electrical connections are arranged in a compact fashion such that the diodes 70 readily will fit within a diode housing 72 fit into the rotor shaft assembly 30. The diode housing 72 provides support to the diodes 70, electrical connections and insulation of the various electrical circuits. It should be understood that additional components may be provided within the diode housing 72 to provide support and electrical insulation.

In one non-limiting embodiment, the gearbox mounting flange 20F and the main generator power section 22 are axially located between the bearing arrangements 34A, 34B. The exciter 24 is mounted on the rotor shaft assembly 30 axially outboard of the second main bearing 34B. The PMG 28 is axially inboard of the exciter 24 and the exciter 24 is mounted opposite the accessory gearbox AG, i.e. the main generator power section 22 is located between the exciter 24 and the drive gear 20G.

The rotor shaft assembly 30 generally includes a disconnect shaft 38 and a stub shaft 40. The stub shaft 40 plugs into the rotor shaft assembly 30 and is supported within a cylindrical section 20GS of the drive gear 20G. The stub shaft 40 plugs into the rotor shaft assembly 30 at splines 40S, 36S and the stub shaft 40 is axially retained within the cylindrical section 20GS between a flange 36F in the rotor shaft assembly 30 and a retainer ring 43. It should be understood that various shaft arrangements, sections and components may alternatively or additionally be provided.

The stub shaft 40 in the disclosed non-limiting embodiment includes a reduced diameter torsional section 40T and a shear section 40A. The torsional section 40T provides a relatively low torsional stiffness to minimize torque spike transmissibility. The shear section 40A is essentially a fuse which will provide a controlled break should excessive gear train torque loads occur without damage to other components. A new stub shaft 40 may thereby be readily replaced during subsequent maintenance operations.

The drive gear 20G is supported by bearing arrangement 34A which includes a first drive gear bearing 34A-1 and a second drive gear bearing 34A-2. The drive gear bearings 34A-1, 34A-2 are located between the cylindrical section 20GS and the housing 20H on either side of the drive gear 20G.

A disconnect system 42 (depicted in greater detail in FIGS. 4 and 5) provides the ability to mechanically disengage the generator 20 from the accessory gearbox AG should a generator failure occur. The disconnect system 42 includes disconnect jaws 38J adjacent an end section of the disconnect shaft 38 which selectively mesh with inputs jaw 40J on the stub shaft 40. A spring 41 biases the disconnect shaft 38 toward the stub shaft 40 for normal operations.

Figure 4:
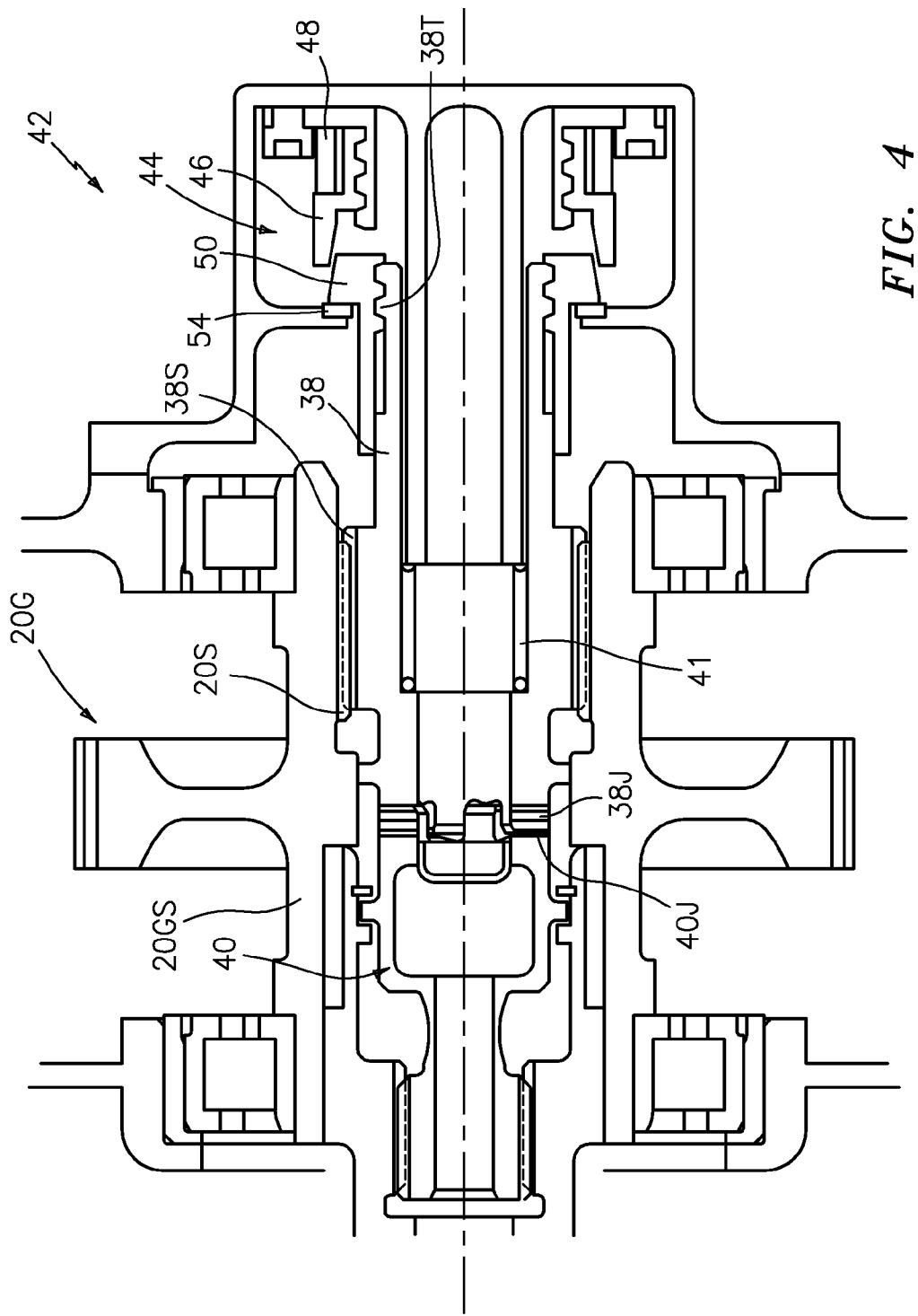
FIG. 4 is an expanded view of one non-limiting embodiment of a disconnect system.
Figure 5:
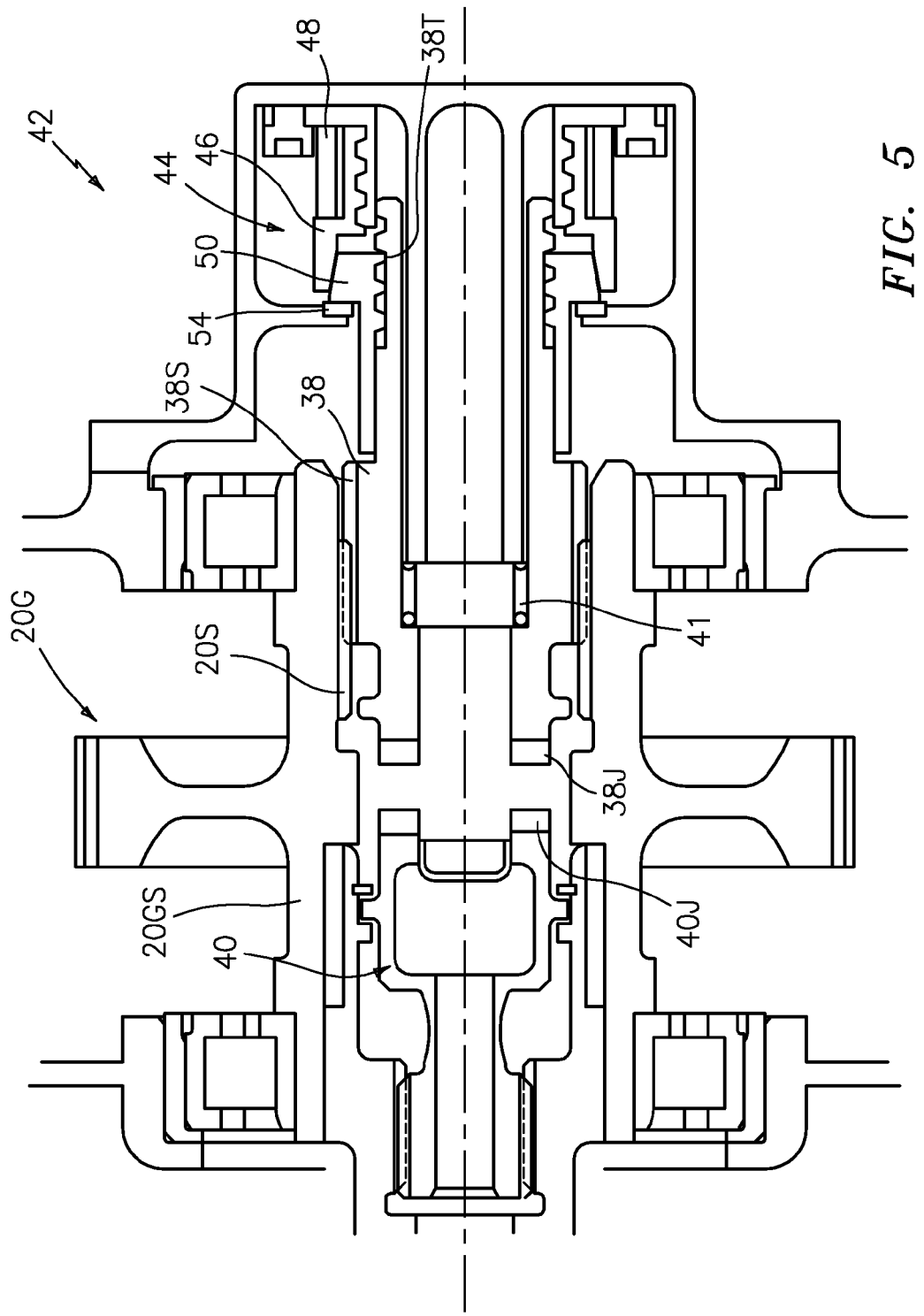
FIG. 5 is an expanded view of the disconnect system of FIG. 4 in a disconnected condition.

The disconnect system 42, in one non-limiting embodiment, includes a self energizing cone brake assembly 44 (also illustrated in FIGS. 4 and 5). The cone brake assembly 44 is one non-limiting embodiment of the disconnect system 42 which facilitates brake operations of the relatively high speed 2-Pole Integrally Mounted Gearbox Generator. The disconnect system 42 may be actively actuated via an electric/thermal solenoid or passively through, for example, melting of a lock such as a eutectic solder.

Referring to FIG. 4, the cone brake assembly 44 generally includes a cone brake 46, a torsion spring 48, and a cone brake shaft 50 mounted to the disconnect shaft 38 through an ACME thread 38T. When actuated, the cone brake 46 is released to axially translate via the torsion spring 48 and contact the cone brake shaft 50. Once contact is made between the cone brake 46 and the cone brake shaft 50, the cone brake shaft 50 is braked relative to the rotational speed of the disconnect shaft 38. Since the cone brake shaft 50 is mounted to the disconnect shaft 38 on the ACME thread 38T and the cone brake shaft 50 is axially constrained by a thrust bearing 54, the disconnect shaft 38 axially translates away from the stub shaft 40 along splines 20S, 38S within the cylindrical section 20GS (FIG. 5). When the disconnect shaft 38 axially translates away from the stub shaft 40 along splines 20S, 38S on the ACME thread 38T, the jaws 38J, 40J separate.

Figure 6:
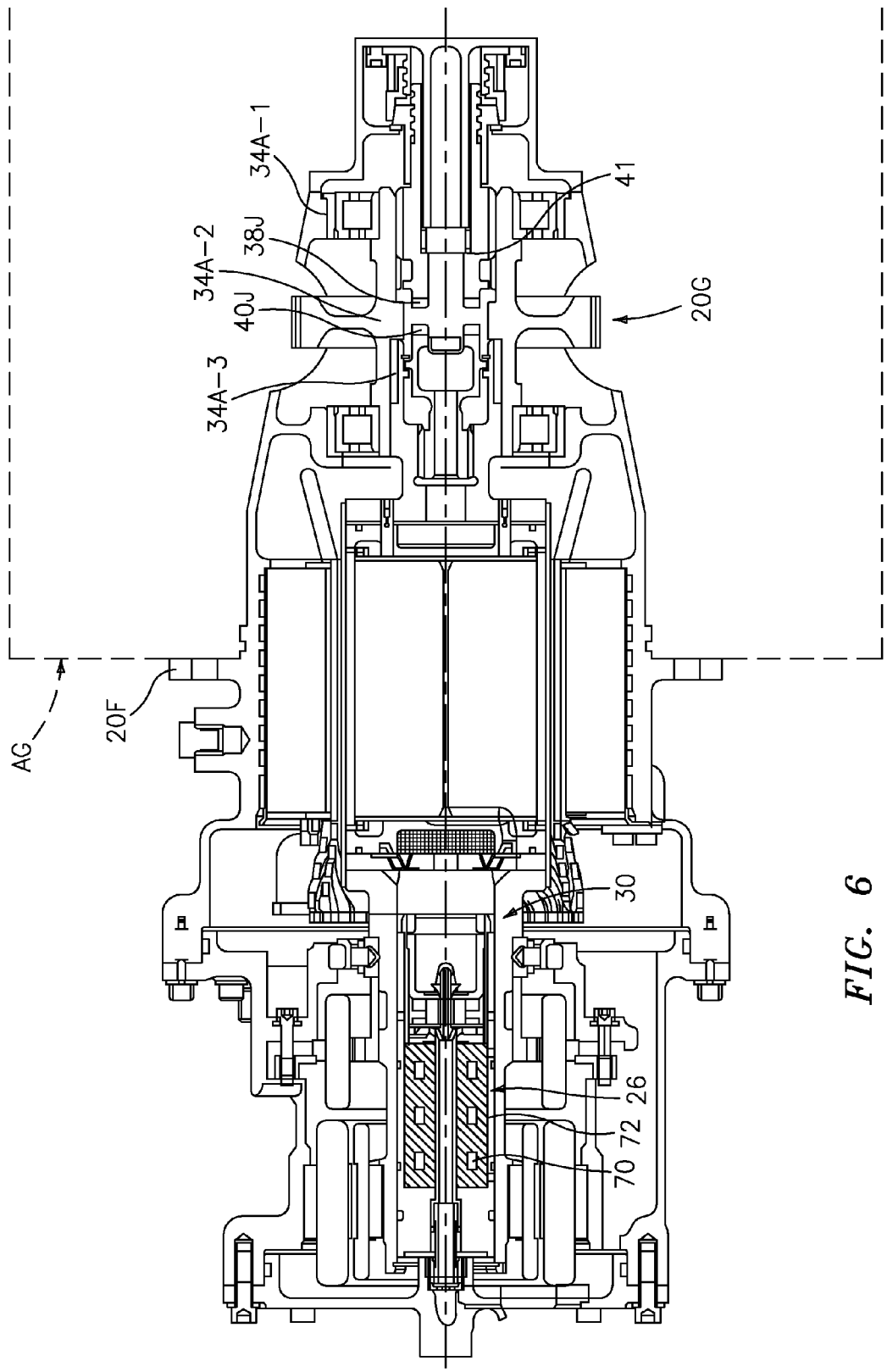
FIG. 6 is a sectional view of the generator of FIG. 2 disconnected from the accessory gearbox.

With reference to FIG. 6, once the jaws 38J, 40J have separated, the mechanical power transmitted into the rotor shaft assembly 30 ceases and the speed of the generator 20 coasts down to zero rpm through the drive gear bearings 34A-1, 34A-2. In one non-limiting embodiment, the drive gear bearings 34A-1, 34A-2 allow the drive gear 20G to continue rotation and thereby transmit power through the accessory gearbox AG to any downstream systems. A bearing 34A-3 located within the cylindrical section 20GS supports the rotor shaft assembly 30 within the cylindrical section 20GS of the drive gear 20G. It should be understood various bearing arrangements may alternatively or additionally be provided.

If a generator failure should occur, the generator 20 may be disconnected from the accessory gearbox AG without effect to downstream systems which are in meshed engagement through the geartrain G of the accessory gearbox AG. That is, the accessory gearbox AG can still drive the downstream system with the generator 20 disconnected from the accessory gearbox AG even though drive gear 20G is integral with geartrain G.

Figure 7:
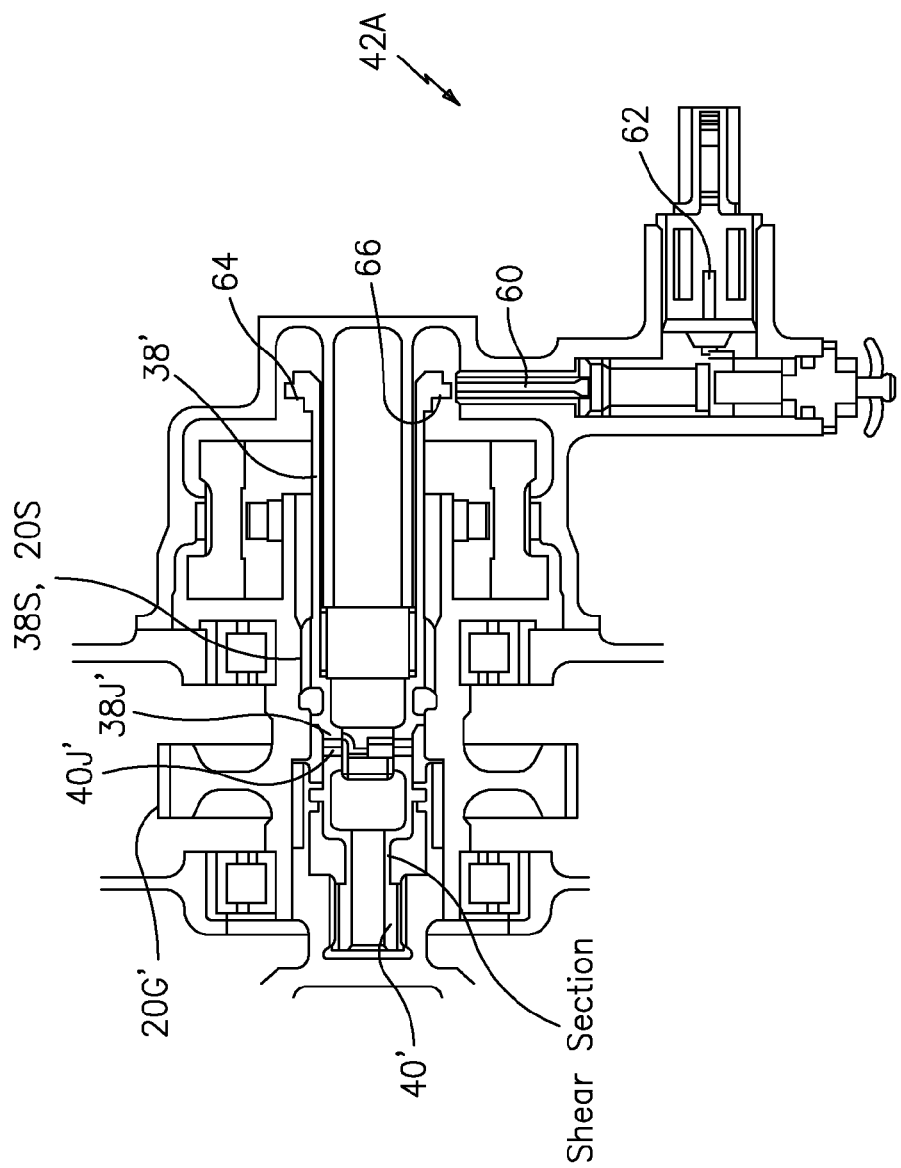
FIG. 7 is another non-limiting embodiment of a disconnect system.

With reference to FIG. 7, another non-limiting embodiment of a disconnect system 42A includes a plunger 60 which is selectively actuated by an electric/thermal solenoid 62. When actuated, the plunger 60 rides along a ramp helix 64 of the disconnect shaft 38' to a lockout diameter 66 which maintains the disconnect jaw 38J' axially separated from the input jaws 40J'. That is, engagement of the plunger 60 with the ramp helix 64 results in axial translation of the disconnect shaft 38' along the splined interface 38S; 20S to separate the disconnect jaw 38J' from the input jaw 40J' which disconnects the drive gear 20G' as discussed above. Disconnect system 42A may be externally resettable in a manual manner during a maintenance procedure.

Figure 8:
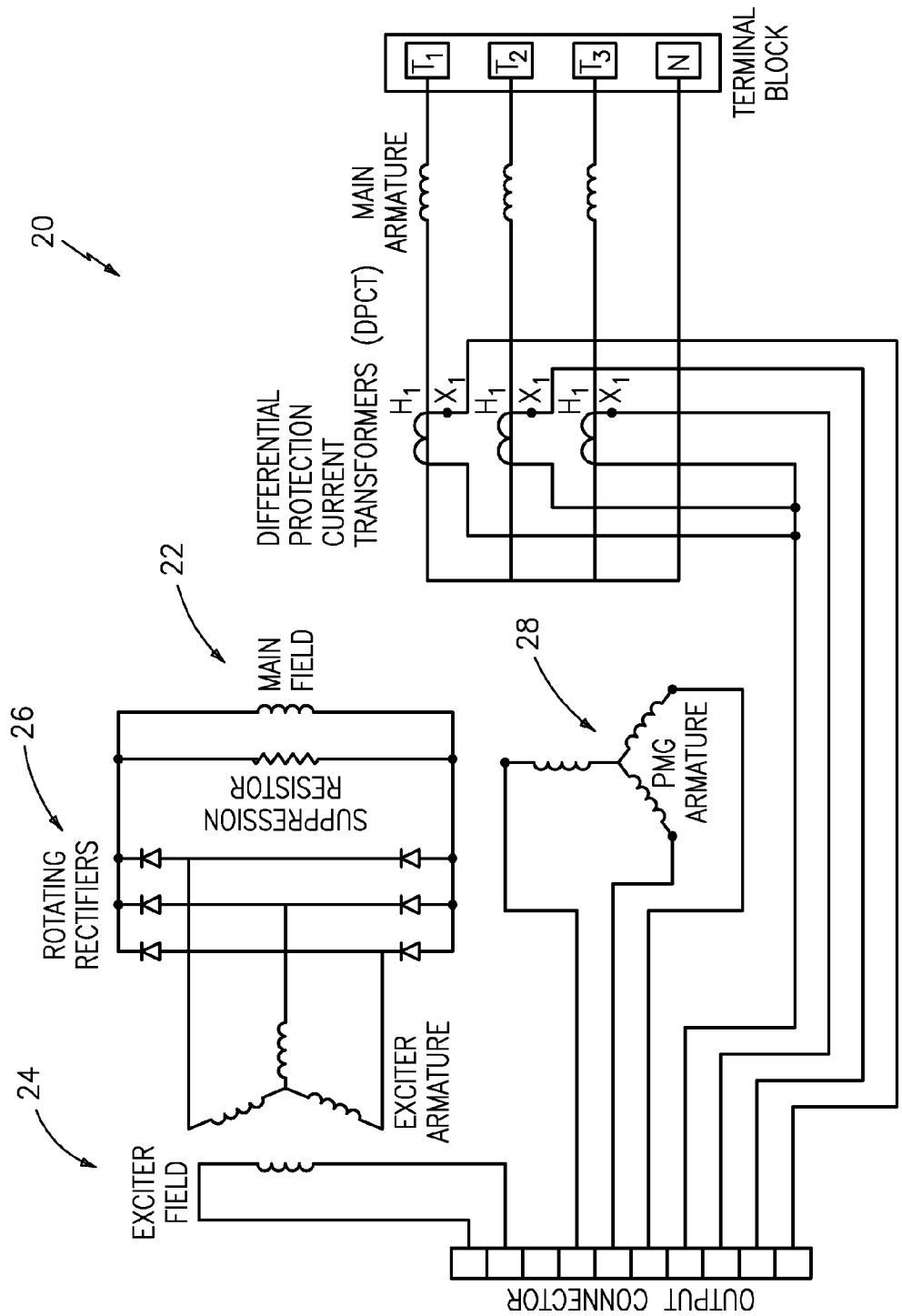
FIG. 8 is an electrical schematic of the generator.

With reference to FIG. 8, the three phase output of the exciter 24 is connected to the rotating rectifier AC connections and the DC output of the rectifier assembly 26 is connected to the main generator power section 22. The AC output of the exciter 24 is provided to the rectifier assembly 26 via lead wires which extend inward from the exciter 24 to the rectifier assembly 26. The lead wires are attached to the individual windings within the exciter 24 and connected individually to the three AC circuits within the rectifier assembly 26. The DC output of the rectifier assembly 26 is connected to the main generator power section 22 via wires or bus bars which extend axially and radially from the rectifier assembly 26 to the main generator power section 22.

The generator 20 arrangement disclosed herein also allows a resolver (not shown) to be packaged therein. The resolver is a rotary device that includes a rotor and a stator. The resolver rotor is mounted to the rotor shaft assembly 30 and the stator is mounted to the housing. The resolver provides an electrical signal that can be used by a control unit for the generator or starter/generator to identify the position of the generator or starter/generator rotor relative to the housing. The exact construction of the resolver rotor and stator varies, and may consist of a wound rotor or a solid rotor. The resolver stator consists of one or more windings which couple with the rotating magnetic field produced by the resolver rotor. This coupling produces an electrical signal within the stator windings that is fed to the control unit to determine rotor position. Rotor position information is used by the control unit to determine the appropriate control signals that must be applied to the generator or starter/generator to achieve proper operation.

The generator 20 provides a packaging arrangement in which the heaviest portions of the generator 20 are located close to the gearbox mounting flange 20F. This minimizes the overhung moment that must be reacted by the accessory gearbox AG and allows both the generator housing 20H and accessory gearbox housings to be lighter. This packaging arrangement also minimizes housing and shaft/bearing weight between the generator 20 and accessory gearbox AG as they are share components.

Even with the minimized overhung moment, the generator 20 provides a packaging arrangement that maintains desired generator design features such as a generator mechanical input shaft shear fuse (shear section) should excessive gear train torque loads occur, a shaft with a relatively low torsional stiffness to minimize torque spike transmissibility, the ability to mechanically disengage the generator 20 from the accessory gearbox AG if a generator failure should occur, the ability to package a resolver for start performance, and a shaft internal rectifier assembly packaging arrangement.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. An accessory system comprising:
   an accessory gearbox which includes a geartrain;
   a 2-Pole generator integrally mounted with said accessory gearbox such that a drive gear of said generator is in meshing engagement with said geartrain; and
   a drive shaft engaged with a stub shaft, said stub shaft selectively engaged with a disconnect shaft at a jawed interface, said disconnect shaft splined to said cylindrical section.

2. The accessory system as recited in claim 1, wherein said geartrain includes one or more of a first and a second gear in meshed engagement with said drive gear.

3. The accessory system as recited in claim 1, wherein said geartrain is drivable with said drive gear disconnected from said generator.

4. The accessory system as recited in claim 1, further comprising:
   a generator housing which defines a scallop, said drive gear extends through an opening formed through said scallop.

5. The accessory system as recited in claim 1, further comprising a mounting flange defined by said generator housing, said mounting flange axially located adjacent to a main generator power section.

6. The accessory system of claim 5, wherein the mounting flange includes a constant wall thickness.

7. The accessory system of claim 5, wherein the mounting flange includes a plurality of mounting apertures.

8. The accessory system as recited in claim 1, wherein said drive gear includes a cylindrical section.

9. The accessory system as recited in claim 1, wherein said disconnect shaft is axially movable within said cylindrical section.

10. The accessory system as recited in claim 1, wherein the accessory gearbox surrounds an end portion of the 2-pole generator.

11. A 2-Pole generator comprising:
    a generator housing which defines a flange;
    a drive shaft assembly supported within said generator housing; and
    a main generator power section supported on said drive shaft assembly axially adjacent said flange; and
    a drive gear selectively connected to said drive shaft assembly through a
    disconnect system, wherein said disconnect system includes a cone brake.

12. The generator as recited in claim 11, further comprising:
    a drive gear selectively connected to said drive shaft assembly through a disconnect system.

13. The generator as recited in claim 12, wherein said disconnect system includes a plunger which is selectively actuated by a solenoid.

14. The generator as recited in claim 11, wherein said main rotor shaft includes a shear section.

15. The generator as recited in claim 11, wherein said main rotor shaft includes a torsionally compliant section.

16. The generator as recited in claim 11, wherein the drive shaft is supported by a first bearing arrangement and a second bearing arrangement and the main generator power section is located between the first bearing arrangement and the second bearing arrangement.

17. The generator as recited in claim 16, wherein the main generator power section is located on a first side of the first bearing arrangement and a drive gear is located on a second side of the first bearing arrangement.

18. The generator as recited in claim 11, further comprising:
    a rectifier assembly located radially inward of the drive shaft.

* * * * *